United States Patent
Hattori

(10) Patent No.: US 7,266,067 B2
(45) Date of Patent: Sep. 4, 2007

(54) DISK REPRODUCING APPARATUS AND DISK REPRODUCING METHOD

(75) Inventor: Hisahide Hattori, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 574 days.

(21) Appl. No.: 10/943,207

(22) Filed: Sep. 17, 2004

(65) Prior Publication Data

US 2005/0083805 A1   Apr. 21, 2005

(30) Foreign Application Priority Data

Oct. 16, 2003   (JP) ............................. 2003-356493

(51) Int. Cl.
*G11B 5/09*   (2006.01)

(52) U.S. Cl. ................. 369/53.2; 369/53.41; 369/47.1; 386/95

(58) Field of Classification Search ...................... None
See application file for complete search history.

(56) References Cited

U.S. PATENT DOCUMENTS

| | | | |
|---|---|---|---|
| 2003/0081525 A1 | 5/2003 | Yoneyama et al. | |
| 2003/0202778 A1* | 10/2003 | Yoshioka | 386/95 |
| 2006/0013562 A1* | 1/2006 | Sugino et al. | 386/95 |

FOREIGN PATENT DOCUMENTS

JP   2003-132630   5/2003

* cited by examiner

*Primary Examiner*—Muhammad Edun
(74) *Attorney, Agent, or Firm*—Pillsbury Winthrop Shaw Pittman, LLP

(57) ABSTRACT

A disk reproducing apparatus comprises a disk reproducing unit configured to reproduce a disk having a recording management area in which an RZone having navigation data is allocated at a head thereof, a plurality of titles are then recorded in a mode in which there is allocated an RZone having presentation data managed by the navigation data, and position information on the RZone is recorded, and a reproduction control unit configured to store position information on the RZone having the navigation data as information indicating a start position of the title and to use the stored information as a title reproduction start position.

14 Claims, 12 Drawing Sheets

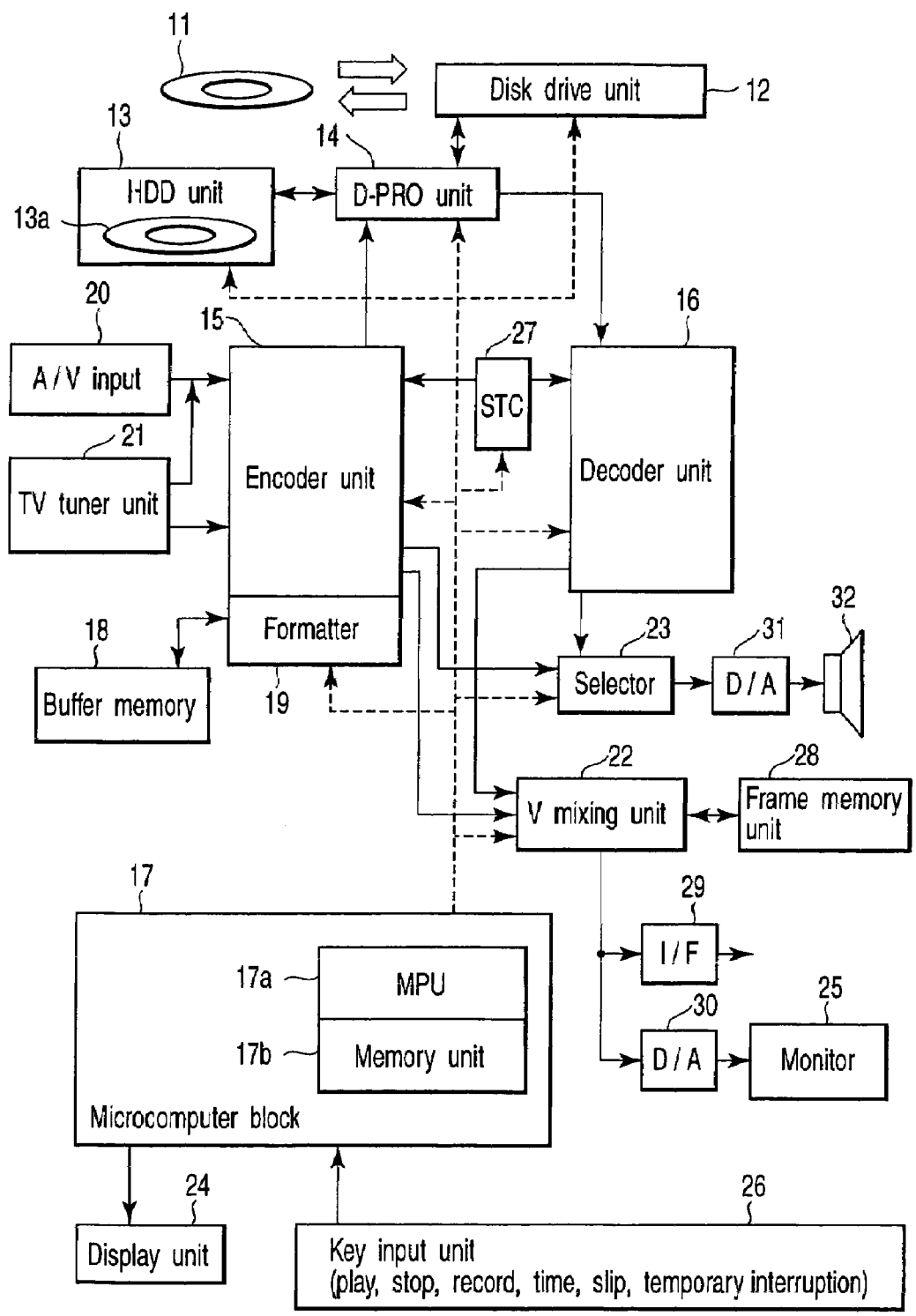
F I G. 1

Field 4 of RMD

| Byte | Contents |
|---|---|
| 0-1 | Invisible / Complete RZone Number (Last RZone Number) |
| 2-3 | Current appendable reserved RZone number 1 |
| 4-5 | Current appendable reserved RZone number 2 |
| 6-15 | reserved |
| 16-19 | Start sector number of RZone #1 |
| 20-23 | Last recorded address of RZone #1 |
| 24-27 | Start sector number of RZone #2 |
| 28-31 | Last recorded address of RZone #2 |
| : | : |
| 2040-2043 | Start sector number of RZone #254 |
| 2044-2047 | Last recorded address of RZone #254 |

FIG. 11

DISK REPRODUCING APPARATUS AND DISK REPRODUCING METHOD

CROSS-REFERENCE TO RELATED APPLICATIONS

This application is based upon and claims the benefit of priority from prior Japanese Patent Application No. 2003-356493, filed Oct. 16, 2003; the entire contents of which are incorporated herein by reference.

BACKGROUND OF THE INVENTION

1. Field of the Invention

The present invention relates to a disk reproducing apparatus and a disk reproducing method for reproducing an additional description type optical disk, for example, and more particularly, to a disk reproducing apparatus and a disk reproducing method for carrying out data reproduction from a disk before a finalizing process is applied.

2. Description of the Related Art

As well known, in recent years, an information recording technique with high density has been promoted, and an optical disk having a recording capacity of 4.7 GB (Giga Bytes) on a single-sided single layer has been available in practice.

As this optical disk, there are a reproduction only DVD-ROM (Digital Versatile Disk-Read Only Memory); a rewritable DVD-RAM (Random Access Memory); a DVD-RW (Rewritable); +RW; and an additionally describable DVD-R (Recordable).

In this case, an additional description type optical disk can have compatibility so that by applying a recording end process, a so-called finalizing process, reproduction can be carried out by any DVD recording and reproducing equipment which is commercially available.

In the meantime, before the finalizing process is applied, a DVD video title recorded in an optical disk is managed on the optical disk by using a management table produced uniquely for each manufacturer of DVD recording and reproducing equipment.

Thus, an optical disk recorded by DVD recording and reproducing equipment available from a predetermined manufacturer cannot be reproduced unless the DVD recording and reproducing equipment available from the predetermined manufacturer has been used, before the finalizing process is applied. Currently, compatibility with DVD recording and reproducing equipment available from another manufacturer cannot be obtained.

In Jpn. Pat. Appln. KOKAI Publication No. 2003-132630, there is disclosed a technique of reducing a finalizing processing time. However, there is not mentioned compatibility of enabling an optical disk before the finalizing process is applied to be reproduced by DVD recording and reproducing equipment available from any manufacturer.

BRIEF SUMMARY OF THE INVENTION

According to one aspect of the present invention, there is provided a disk reproducing apparatus comprising: a disk reproducing unit configured to reproduce a disk having a recording management area in which an RZone having navigation data is allocated at a head thereof, a plurality of titles are then recorded in a mode in which there is allocated an RZone having presentation data managed by the navigation data, and position information on the RZone is recorded; and a reproduction control unit configured to store position information on the RZone having the navigation data as information indicating a start position of the title and to use the stored information as a title reproduction start position.

According to another aspect of the present invention, there is provided a disk reproducing method comprising: a first step of reproducing a disk having a recording management area in which an RZone having navigation data is allocated at a head thereof, a plurality of titles is then recorded in a mode in which there is allocated an RZone having presentation data managed by the navigation data, and position information on the RZone is recorded; and a second step of storing position information on the RZone having the navigation data as information indicating a start position of the title and using the stored information as a title reproduction start position.

BRIEF DESCRIPTION OF THE SEVERAL VIEWS OF THE DRAWING

FIG. 1 is a block diagram depicting one embodiment of the present invention, the diagram being provided for illustrating a disk recording and reproducing apparatus;

FIG. 11 is a view provided for illustrating a detail on Field 4 for managing a start address of each RZone in an RMD which configures the recording management area RMA in the embodiment;

DETAILED DESCRIPTION OF THE INVENTION

Figure 2:
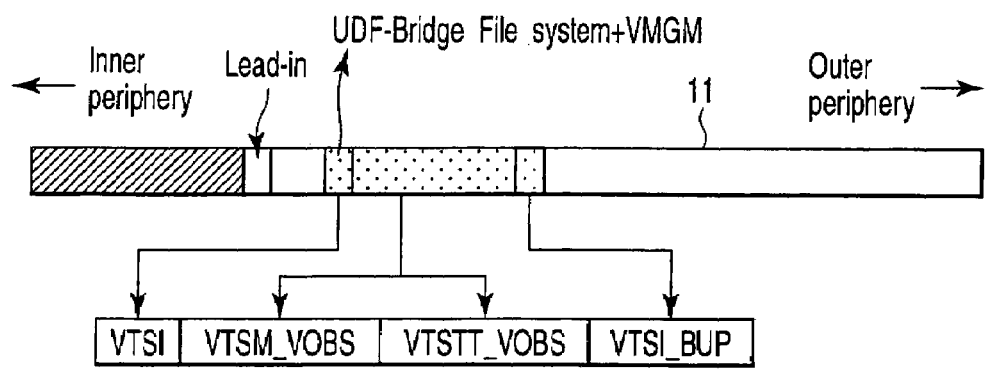
FIG. 2 is a view provided for illustrating a DVD video title configuration on an optical disk in the embodiment.

Hereinafter, one embodiment of the present invention will be described in detail with reference to the accompanying drawings. FIG. 1 shows a disk recording and reproducing apparatus described in the present embodiment. This disk recording and reproducing apparatus can handle both of an optical disk and a hard disk, the optical disk including DVD-R which is a recording medium. As the recording medium, for example, a semiconductor memory or the like can be used.

That is, the disk recording and reproducing apparatus shown in FIG. 1 is roughly divided as follows. That is, on the left side of the figure, a main recording block exists; on the right side of the figure, a main reproducing block exists; and at the lower part of the figure, a main control block exists.

In addition, this disk recording and reproducing apparatus has two types of disk drive units. First, this apparatus has a disk drive unit 12 for rotatably driving an optical disk 11 as a first medium which is an information recording medium capable of constructing a video file, the disk drive unit 12 executing reading and writing of information. Further, this apparatus has an HDD (Hard Disk Drive) unit 13 for driving a hard disk 13a as a second medium.

A D-PRO (Data-Processor) unit 14 can supply recording data to the disk drive unit 12 and the HDD unit 13, and can receive a reproduced signal. The disk drive unit 12 has a rotation control system for the optical disk 11, a laser drive system, an optical system and the like. The D-PRO unit 14 handles data in units of recording or reproducing operation, and includes a buffer circuit, a modulator/demodulator circuit, an error corrector unit and the like.

Moreover, this disk recording and reproducing apparatus primarily comprises: an encoder unit 15 configuring a recording side; a decoder unit 16 configuring a reproducing side; and a microcomputer block 17 for controlling an operation of an apparatus main body.

The encoder unit 15 has: a video and audio analog digital converter for digitizing an analog video signal and an analog audio signal which have been inputted, a video encoder, and an audio encoder. Further, this encoder unit also includes a subsidiary picture encoder.

An output of the encoder unit 15 is converted into a predetermined DVD-Video format by means of a formatter 19 which includes a buffer memory 18, and the converted output is supplied to the preceding D-PRO unit 14.

An external analog video signal and an external analog video signal which are obtained from an A/V (Audio Video) input unit 20 or an analog video signal and an analog audio signal which are obtained from a TV (Television) tuner unit 21 are inputted to the encoder unit 15.

When a compressed digital video signal and digital audio signal are directly inputted, the encoder unit 15 can supply the compressed digital video signal and digital audio signal directly to the formatter 19.

In addition, the encoder unit 15 can supply the analog-digital converted digital video signal and audio signal directly to a V (Video) mixing unit 22 and an audio selector 23.

In the video encoder included in the encoder unit 15, a digital video signal is converted into a digital video signal compressed at a variable bit rate based on an MPEG (Moving Picture Experts Group) 2 or MPEG1 standard. A digital audio signal is converted into a digital audio signal compressed at a fixed bit rate or a digital audio signal for linear PCM (Pulse Code Modulation), based on an MPEG or AC (Audio Compression)-3 standard.

When a sub picture signal (for example, a signal from a DVD video player with an independent output terminal for a subsidiary picture signal) has been inputted from the A/V input unit 20 or when a DVD video signal with a data structure has been broadcast, and the broadcast signal has been received by the TV tuner unit 21, a sub picture signal of the DVD video signals is encoded (run length encoded) by means of the sub picture encoder, and the encoded signal is provided as a sub picture bit map.

The encoded digital video signal, digital audio signal, and sub picture data are packed by means of the formatter 19. These packed signals and data are provided as a video pack, an audio pack, and a sub picture pack. Further, these packs are collected, and are converted into a format defined in a DVD-Video standard (for example, a standard recorded in the DVD-RAM, DVD-RW, DVD-R or the like).

Here, the disk recording and reproducing apparatus shown in FIG. 1 can supply the information (a pack of video, audio, sub picture data, or the like) formatted by the formatter 19 and the produced management information to the HDD unit 13 or disk drive unit 12 via the D-PRO unit 14, and can record the supplied information in the hard disk 13a or the optical disk 11.

In addition, this apparatus can also record the information recorded in the hard disk 13a or optical disk 11 in the optical disk 11 or hard disk 13a via the D-PRO unit 14 and disk drive unit 12.

The microprocessor block 17 includes an MPU (Micro Processor Unit) 17a and a memory unit 17b. The memory unit 17b includes: a ROM having stored therein a control program executed by the MPU 17a; and a RAM for providing to the MPU 17a a work area required for executing the program.

Of an execution result of the microcomputer block 17, the content which should be notified to a user is displayed on a display unit 24 incorporated in the disk recording and reproducing apparatus or is an OSD (On Screen Display) displayed on an externally connected monitor display 25. Further, the microcomputer block 17 has a key input unit 26 which provides an operating signal for operating this apparatus.

The above-described microcomputer block 17 can define a timing of controlling the disk drive unit 12, HDD unit 13, D-PRO unit 14, encoder unit 15, and decoder unit 16, etc. based on time data from an STC (System Time Clock) 27. Although a recording or reproducing operation is generally executed based on the time clock from the STC 27, any other operation may be executed at a timing which is independent of the time clock from the STC 27.

The decoder unit 16 has: a separator for separately capturing each pack from a signal in accordance with the DVD-Video format having a pack structure; a memory used during execution of one pack separation and the other signal processing; a V decoder for decoding main picture data (contents of a video pack) separated by the separator; an SP (Sub Picture) decoder for decoding the sub picture data (contents of a sub picture pack) separated by the separator; and an A (Audio) decoder for decoding audio data (contents of an audio pack) separated by the separator. In addition, this decoder unit comprises a video processor for properly combining the decoded sub picture with the decoded main picture, and outputting a menu, a highlight button, a subtitle and any other sub picture to be superimposed on the main picture.

An output video signal of the decoder unit 16 is inputted to the V mixing unit 22. Combining of text data is carried out at the V mixing unit 22. In addition, a line for directly capturing a signal from the TV tuner unit 21 or A/V input unit 20 is also connected to the V mixing unit 22.

A frame memory unit 28 used as a buffer is connected to the V mixing unit 22. When an output of the V mixing unit 22 is an analog output, it is externally outputted via an I/F (Interface) 29. In the case of a digital output, it is outputted to the external monitor display 25 via a D/A (Digital/Analog) converter 30.

The output audio signal of the decoder unit 16 is analog-converted by means of a D/A converter 31 via the selector 23, and the analog-converted signal is outputted to an externally connected speaker 32. The selector 23 is controlled by means of a select signal from the microcomputer block 17. In this manner, when a digital signal from the A/V input unit 20 or TV tuner unit 21 is directly monitored, the selector 23 can select a signal through the encoder unit 15 directly.

FIG. 2 shows a DVD video title configuration on the optical disk 11. The DVD video standard defines that a DVD video title is composed of: navigation data (VTSI: IFO file) for controlling reproduction; presentation data (VTSM_VOBS, VTSTT_VOBS: VOB file) which is a generic name of video image and voice data; and a navigation data backup (VTSI_BUP: BUP file).

The navigation data backup is completely identical to navigation data in contents, and is provided as data reserved for the case where the navigation data cannot be read. Therefore, this backup is not required in general reproduction.

Although there is no need for allocation of these files on the optical disk 11 to be always recorded in a physically continuous area, a relative recording location is determined so that navigation data is located at the head of a DVD video title, and is followed by presentation data and navigation data in backup order.

Figure 3:
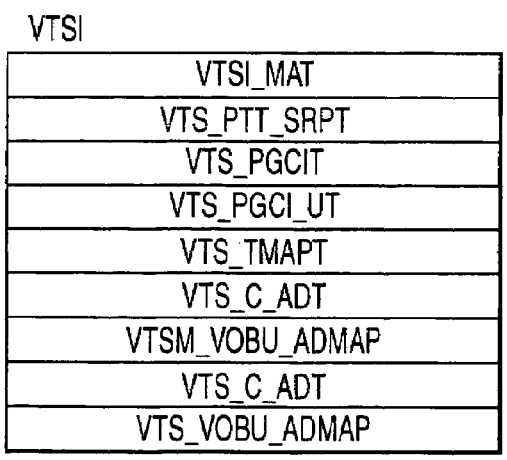
FIG. 3 is a view provided for illustrating a detail on VTSI contained in a DVD video title in the embodiment.

FIG. 3 shows video title set information configuring navigation data (VTSI), the information having recorded therein control information or the like for reproducing presentation data (VTSTT_VOBS, VTSM_VOBS).

Figure 4:
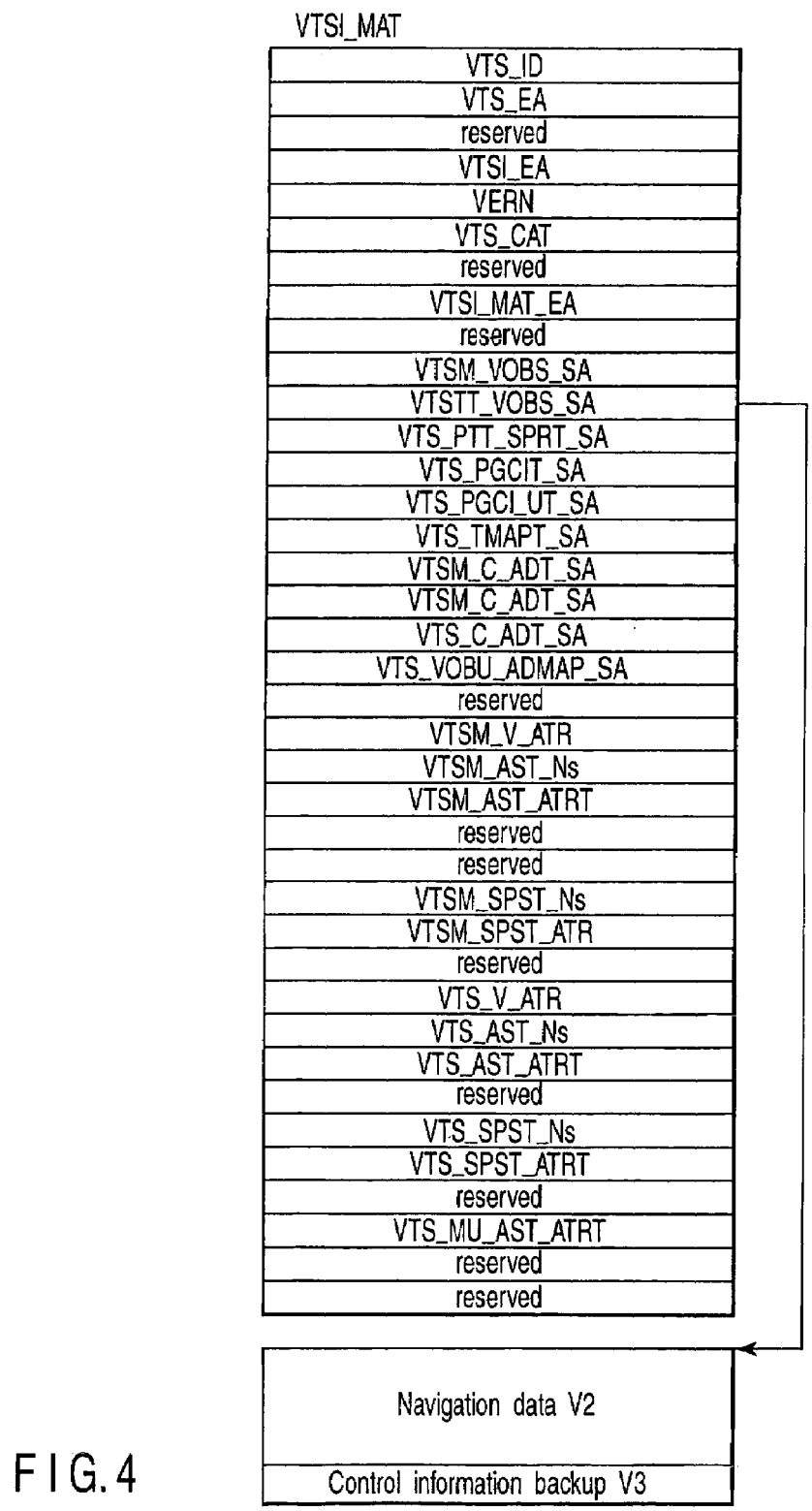
FIG. 4 is a view provided for illustrating a detail on VTSI_MAT contained in the VTSI in the embodiment.

FIG. 4 shows a format of a video table set information management table (VTSI_MAT). In this table, there is described: information concerning a picture attribute (VTS_V_ATR) of a title included in presentation data; a voice attribute (VTS_AST_ATR); a presentation data menu recording location (VTSM_VOBS_SA); and a title recording location (VTSTT_VOBS_SA).

The presentation data address information (VTSTT_VOBS_SA) is recorded in a relative address from the head of this navigation data (VTSI). Namely, when navigation data can be correctly read out, presentation data can also be read out.

The contents of the navigation data are provided as information for controlling a method for reproducing the presentation data, and thus, cannot be determined until recording of all the presentation data has completed.

Thus, in the case of direct image recording, writing into the optical disk 11 is carried out after presentation data recording has completed. As in dubbing or the like, in the case of copying recorded presentation data, a move or copy operation is carried out based on the determined data. Thus, after navigation data has been recorded, presentation data can be recorded.

Figure 5:
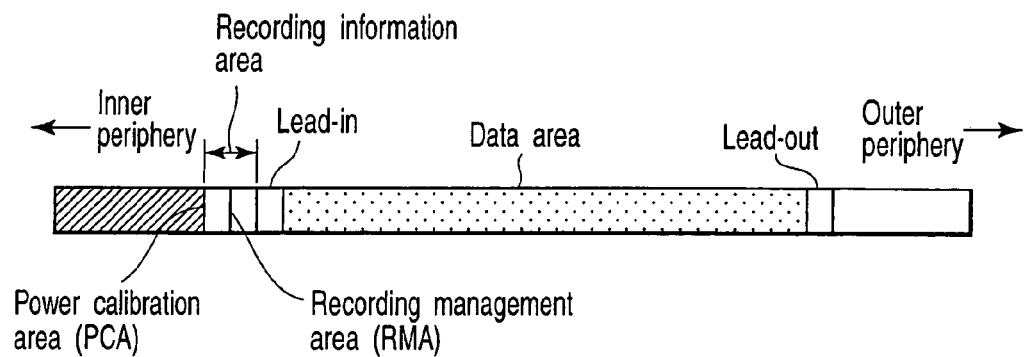
FIG. 5 is a view provided for illustrating a configuration of a recording area of a DVD-R disk in the embodiment.

Now, a configuration of a recording area in a DVD-R disk which is an optical disk 11 will be described with reference to FIG. 5. FIG. 5 shows allocation of a recording area with respect to a radial direction of the DVD-R disk.

In this rewritable DVD-R disk, a recording information area (R-Information Area) having sequentially allocated therein an output calibration area PCA (Power Calibration Area) and a recording management area RMA (Recording Management Area) is provided from its inner periphery side to its outer periphery side.

In addition, an information area consisting of a lead-in area, a data area, and a lead-out area is further allocated by recording data in the DVD-R disk.

Among them, the data area is provided as an area in which data is recorded. The lead-in area is provided to be adjacent to the inside of the data area. The lead-out area is provided to be adjacent to the outside of the data area.

In these lead-in area and lead-out area, predetermined management data is recorded when a finalizing process is applied. In this manner, reproduction of the data recorded in the data area can be controlled.

The power calibration area PCA is provided as an area for carrying out trial recording before recording data in the data area. The recording management area RMA is provided as an area for recording an address of an area (RZone) for managing data.

When recording is continuously carried out for the DVD-R disk from its inner periphery side to the outer periphery side, one management area (RZone) will suffice. However, when there is a need for discontinuously carrying out writing, such writing can be carried out by providing an area called RZone in a plurality of disks.

Figure 6:
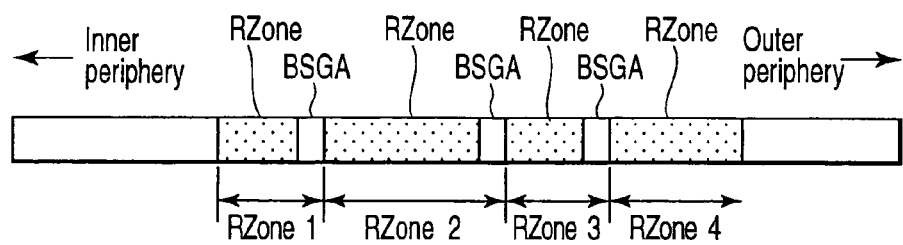
FIG. 6 is a view provided for illustrating that user's data in the embodiment is managed to be divided into a plurality of RZone areas.

A write mode provided for this purpose is provided as an IWM (Incremental Write Mode), and user data is managed to be divided into a plurality of areas (RZone), as shown in FIG. 6. An address of this RZone itself is recorded in the recording management area RMA. At the terminal end of each RZone, a guard area BSGA (Block Sync Guard Area) is written so that next RZone can be correctly read out.

Figure 7:
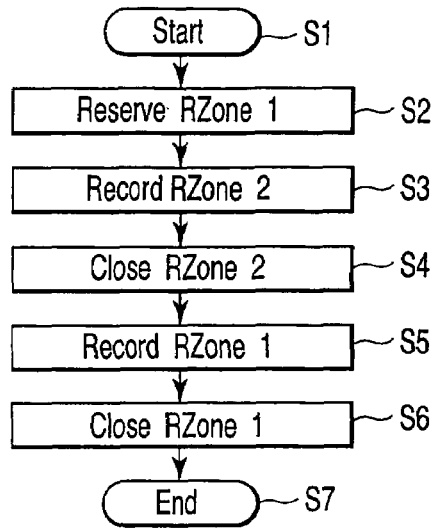
FIG. 7 is a flow chart provided for illustrating an operation for discontinuously recording data in the DVD-R disk in the embodiment.

FIG. 7 shows a method for discontinuously recording data in the DVD-R disk. First, when data recording is started (step S1), the microcomputer block 17 reserves an area (RZone 1) for carrying out writing from a start position of a data area of the DVD-R disk in step S2.

In this manner, writing into a next area (RZone 2) can be carried out in the DVD-R disk. Thus, the microcomputer block 17 carries out recording in the area (RZone 2) in step S3, and closes the area (RZone 2) in step S4.

Next, the microcomputer block 17 carries out recording of data used for management of the data recorded in the area (RZone 2) in step S5. Then, this microcomputer block closes the area (RZone 1) in step S6, and terminates a data recording process (step S7).

Figure 8:
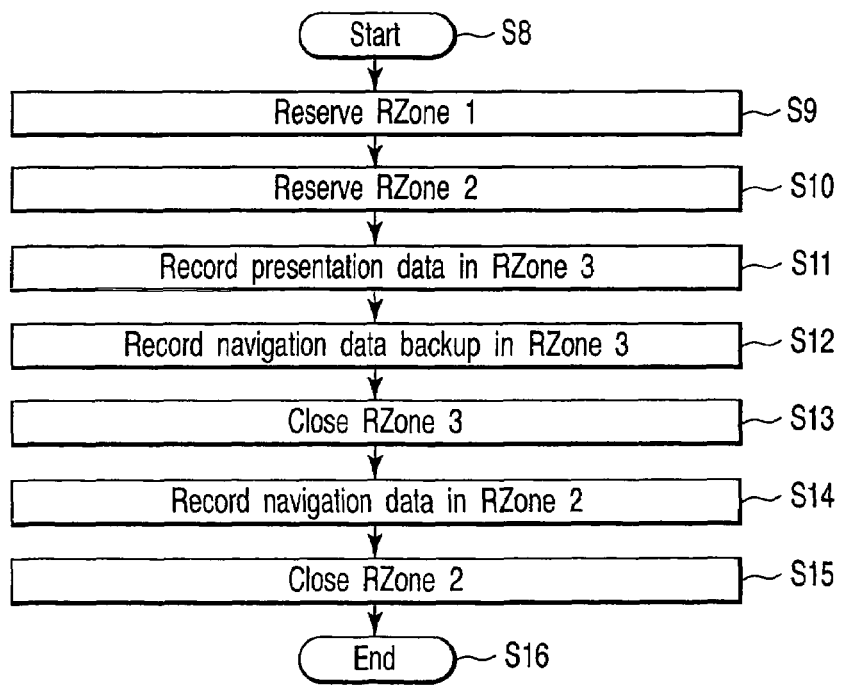
FIG. 8 is a flow chart provided for illustrating an operation for recording a DVD video title in the DVD-R disk in the embodiment.
Figure 9:
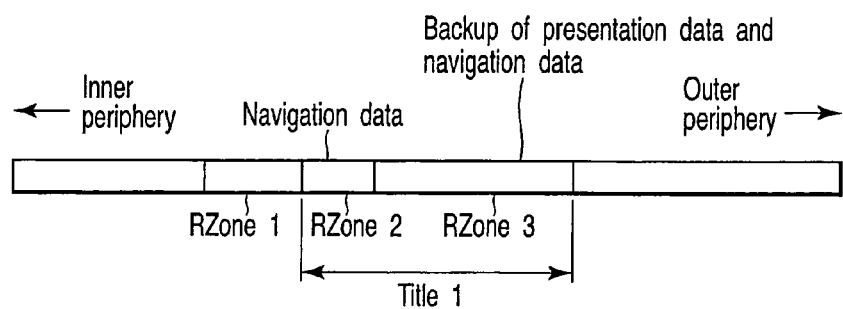
FIG. 9 is a view provided for illustrating a data layout on the DVD-R disk in the embodiment.

FIG. 8 shows a sequence for recording a DVD video title with respect to the DVD-R disk. In addition, FIG. 9 shows a data layout on the DVD-R disk which corresponds to this sequence.

That is, when data recording is started in the DVD-R disk in which data is not recorded (step S8), the microcomputer block 17 reserves an area (RZone 1) for carrying out writing later from the start position of the data area of the DVD-R disk in step S9.

This area (RZone 1) is reserved as a VMG (Video Manager) area having written therein information for managing the titles of a file system and an entire disk. These items of information are recorded in a finalizing processing at a time point when recording of all the titles has completed.

In this manner, in the DVD-R disk, a DVD video title is recorded from the data area immediately after the area (RZone 1). That is, the microcomputer 17 reserves an area (RZone 2) for recording navigation data in step S10, and records presentation data in an area (RZone 3) immediately after RZone 2 in step 11.

The presentation data is recorded, whereby management information for reproducing a DVD video title is established. Thus, the microcomputer block 17 generates navigation data on the presentation data recorded in RZone 3. In step S12, this microcomputer block records backup of that navigation data immediately after the presentation data contained in the area (RZone 3).

Then, the microcomputer 17 closes the area (RZone 3) in step S13; reverts to the area (RZone 2) to record navigation data in the S14; closes the area (RZone 2) in step S15; and terminates a recording process of a DVD video title (step S16).

The above-described operation is repeated, whereby a plurality of DVD video titles can be recorded in the DVD-R disk. Then, when the finalizing process is applied, information for managing the titles of the file system and entire disk is written into a first reserved area (RZone 1), and the area (RZone 1) is closed.

Figure 10:
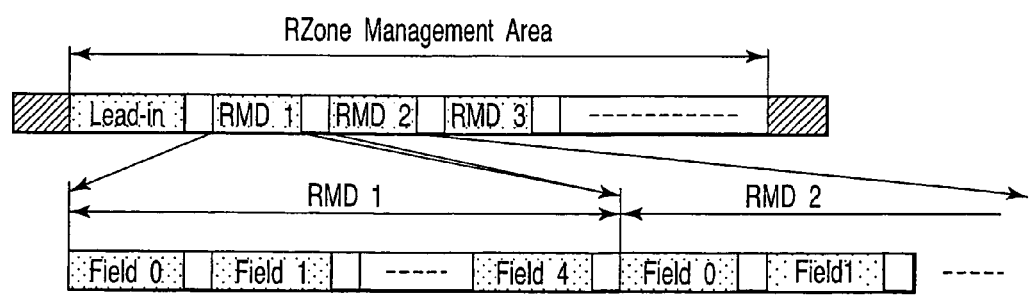
FIG. 10 is a view provided for illustrating a detail on a recording management area RMA of the DVD-R disk in the embodiment.

FIG. 10 shows a detail on the above-described recording management area RMA. FIG. 11 shows a detail on Field 4 for managing the start address of each RZone in the RMD which configures the recording management area RMA.

The recording management area RMA is composed of a lead-in and a plurality of RMDs, and the management information on all RZone areas contained in the disk is recorded. In Field 4 contained in the RMD, the start sector and end sector for each of RZone 1 to RZone 254 are recorded so that each RZone can be managed. In the case of the DVD-R disk, every time RMD is updated, RZone information is recorded in a new RMD.

In descriptions of FIGS. 8 and 9, an example in which one title is composed of two RZone areas has been shown. In this case, however, two items of RZone information per title are recorded in a management table of Field 4.

Figure 12:
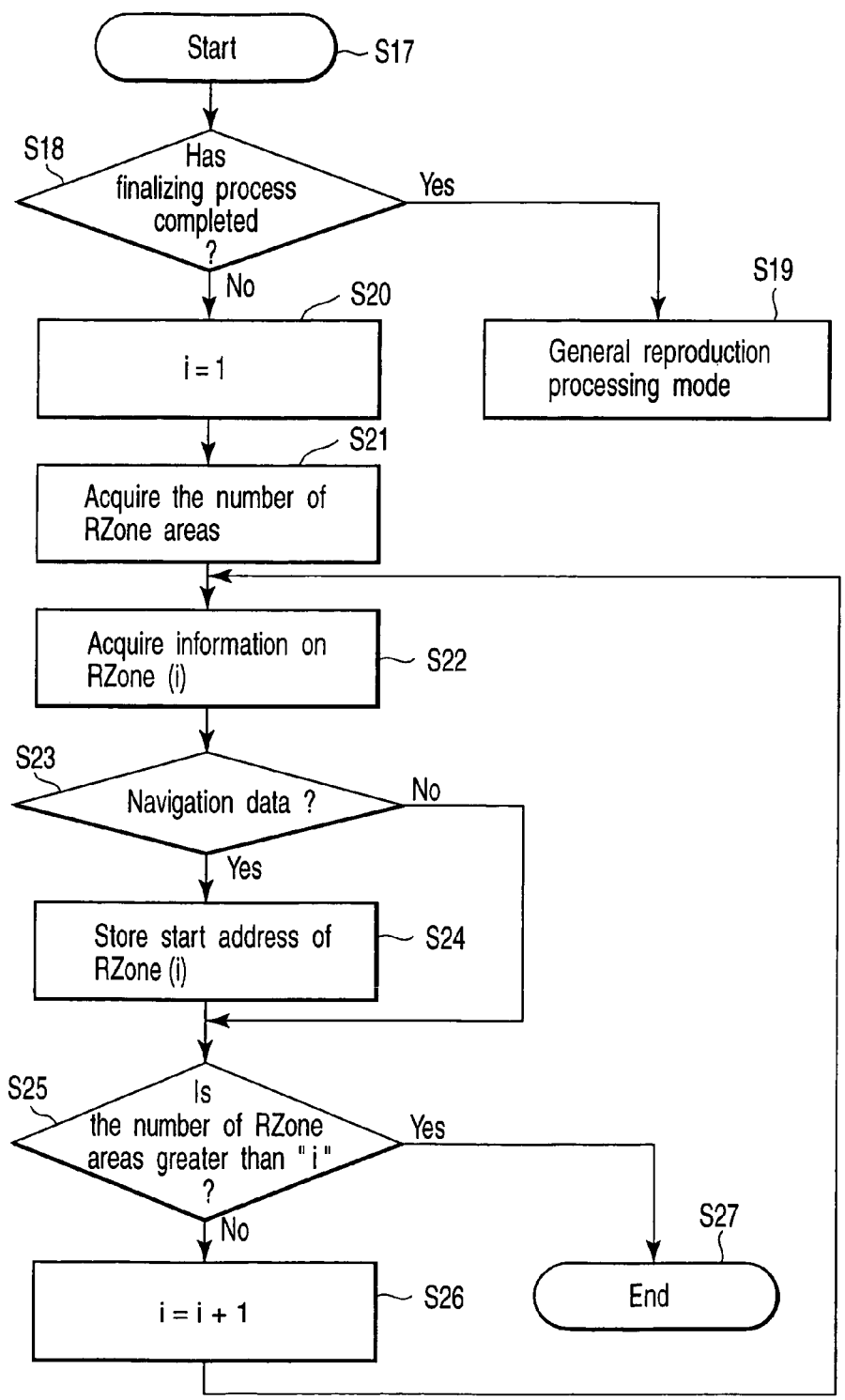
FIG. 12 is a flow chart provided for illustrating an operation of acquiring start position information on a DVD video title from RZone information by using the RMD in the embodiment.

FIG. 12 shows a sequence for making a search for the start position of a DVD video title from the RZone information by using RMD. First, when processing is started (step S17) upon a request for accessing RZone, the microcomputer 17 determines whether or not a finalizing process is applied to the DVD-R disk in step S18.

When it is determined that the finalizing process is applied (YES), the microcomputer block 17 moves to a general reproduction processing mode for the DVD-R disk in step S19.

In addition, when it is determined that the finalizing process is not applied in the above step S18 (NO), the microcomputer 17 sets number "i" of RZone to 1 in step S20; and acquires the number of RZone areas recorded in the DVD-R disk from RMD information in step S21.

Then, the microcomputer block 17 reads out RMD concerning RZone(i) from the DVD-R disk, and reads data on RZone(i) based on the start address of RZone(i) obtained from that RMD information in step S22.

Then, the microcomputer block 17 makes a syntax check as to whether or not data on RZone(i) is navigation data in step S23. When it is determined that the data is navigation data (YES), this microcomputer block 17 stores the start address of that RZone(i) in the memory unit 17a in step S24.

After this step S24 or at the above step S23, when it is determined that the data on RZone(i) is not navigation data (NO), the microcomputer block 17 determines whether or not the number "i" of RZone exceeds the number of RZone areas acquired in step S21, namely, whether or not next RZone exists on the DVD-R disk in step S25.

Then, when it is determined that the number "i" of RZone does not exceed the number of RZone areas (NO), the microcomputer block 17 adds "i" by +1 in step S26. Then, processing reverts to step S22. When it is determined that the number "i" of RZone exceeds the number of RZone areas (YES), processing is terminated (step S27).

That is, RZone having navigation data recorded therein is detected from all RZone areas on the DVD-T disk, and the start address of that RZone is stored, thus making it possible to generate a list of start addresses of all the recorded DVD video titles with respect to the DVD-R disk before the finalizing process is applied.

In this manner, reproduction of the DVD video title before the finalizing process is applied can be carried out for the DVD-R disk having information recorded in equipment available from any manufacturer.

Figure 13:
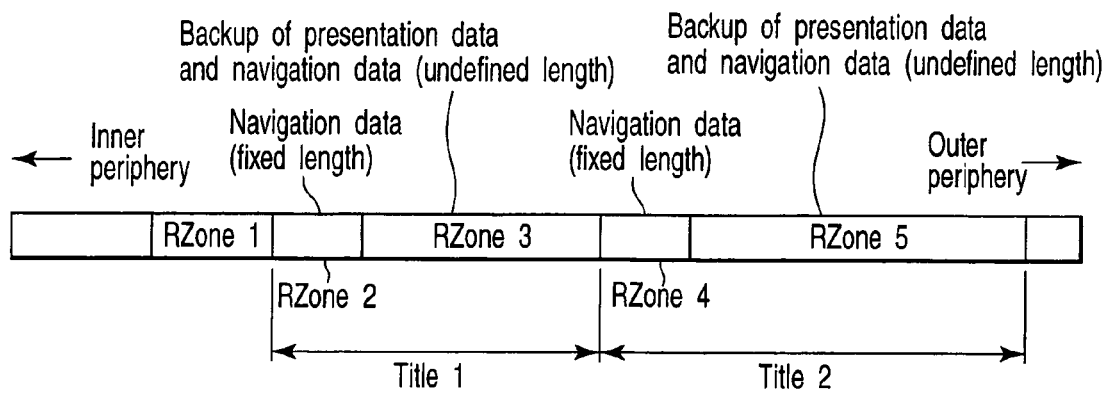
FIG. 13 is a view showing another embodiment of the present invention, the view being provided for illustrating that RZone having navigation data recorded therein is a fixed length.

Now, another embodiment of the present invention will be described here. That is, as shown in FIG. 13, navigation data is recorded after presentation data has been recorded, as described above, and thus, its recording area (RZone) is reserved in a fixed size. On the other hand, the presentation data changes depending on a picture and voice compression rate during recording, a compression mode, a recording time or the like, and thus, the size of its recording area (RZone) is obtained as an undefined length.

When RZone of the same size is detected from the DVD-R disk, there is a high possibility that navigation data is recorded in that detected RZone. Thus, it becomes possible to define that RZone as a candidate for acquiring information indicating the start position of a DVD video title.

By doing this, RZone of the same size may be detected based on the RMD information from the DVD-R disk, thus making it possible to speed up detection of RZone having navigation data recorded therein.

Figure 14:
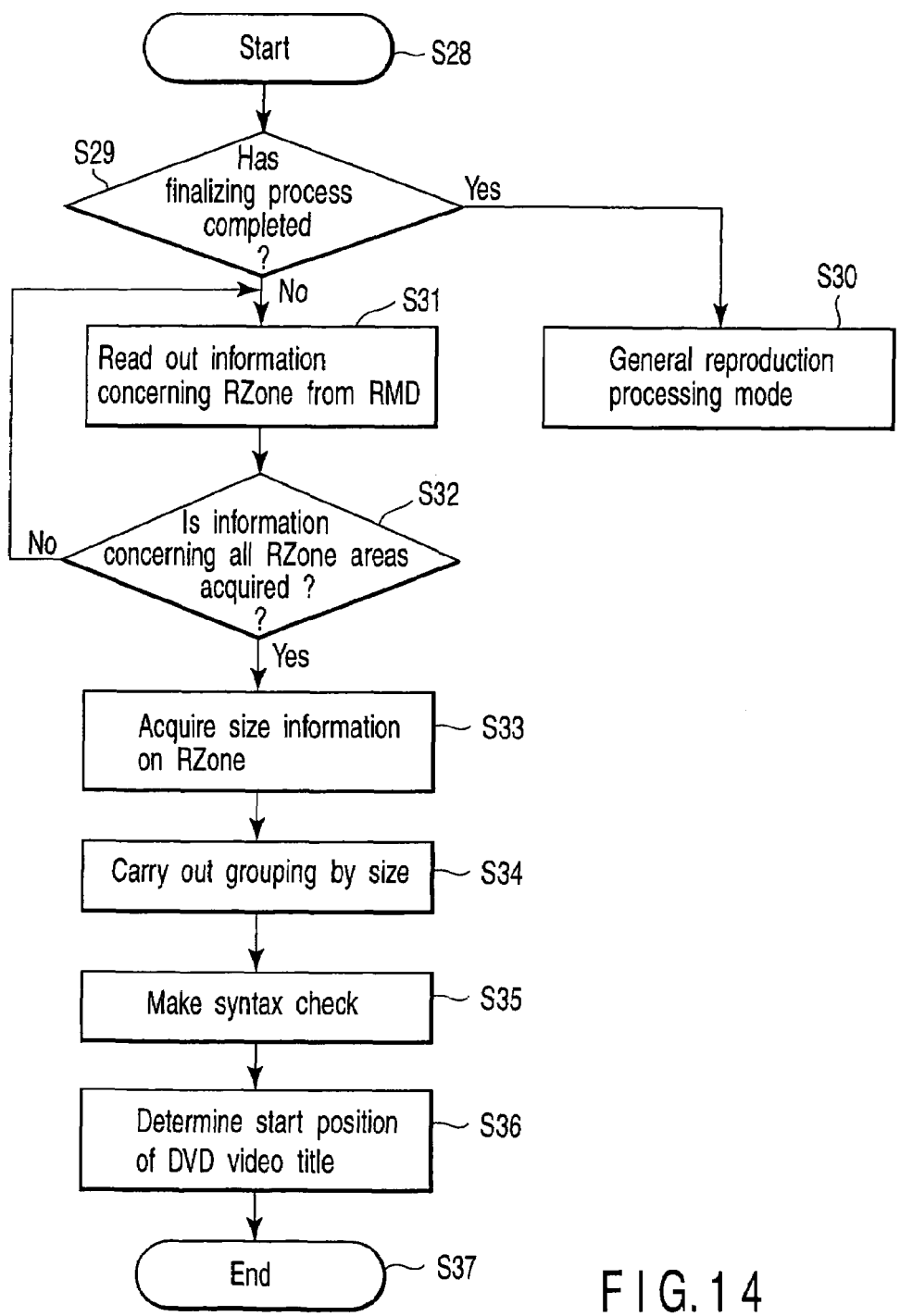
FIG. 14 is a flow chart provided for illustrating an operation of speeding up detection of an RZone having navigation data recorded therein in the embodiment.

FIG. 14 shows a sequence for detecting RZone of the same size and making a search for the start position of a DVD video title from that information. First, when a process for acquiring the start position of the DVD video title is started (step S28), the microcomputer block 17 determines whether or not a finalizing process is applied to the DVD-R disk in step S29.

When it is determined that the finalizing process is applied (YES), the microcomputer block 17 moves to a general reproduction processing mode with respect to the DVD-R disk in step S30.

In addition, when it is determined that the finalizing process is not applied in the above step S29 (NO), the microcomputer block 17 executes readout of information concerning RZone recorded in the DVD-R disk from the RMD in step S31.

When it is determined that all the information concerning RZone is acquired in step S32 (YES), the microcomputer block 17 acquires all the size information on RZone in step S33; and carries out grouping of each RZone depending on the size in step S34. In this way, by collecting RZone of the same size, it becomes possible to define that RZone as a candidate for acquiring information indicating the start position of the DVD video title.

Thereafter, in step S35, the microcomputer block 17 verifies validity by making a syntax check that VTSI to be recorded at the head of the DVD video title has been recorded, namely, that the VTSI is navigation data.

Then, in step S36, the microcomputer block 17 stores the start address relating to the verified RZone in the memory unit 17b, thereby determining the start position of the DVD video title and terminating processing (step S37).

According to the technique as described above, it becomes possible to speedily carry out detection of RZone having navigation data recorded therein and an operation for acquiring information which indicates the start position of the DV video title can be carried out speedily.

In addition, by incorporating such a speedup technique, even when independent RZone for leaving information other than the DVD video title has been recorded on the DVD-R disk, that RZone is valid because it is not defined as a candidate for RZone which has start position information on the DVD video title by using the above-described sequence.

Figure 15:
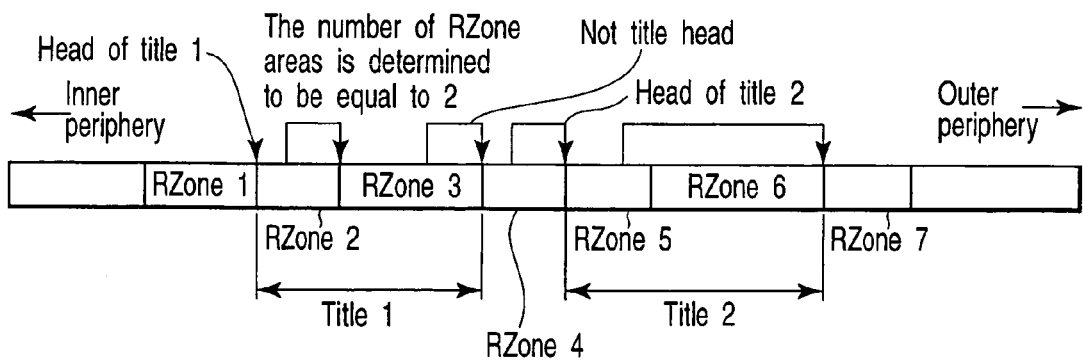
FIG. 15 is a view showing still another embodiment of the present invention, the view being provided for illustrating that the number of RZone areas configuring each DVD video title is equal to each other.

Now, still another embodiment of the present invention will be described here. That is, as shown in FIG. 15, when a plurality of DVD video titles 1, 2 have been recorded in the DVD-R disk, it is possible to presume that the number of RZone areas configuring each of the DVD video titles 1, 2 is equal to each other in that DVD-R disk.

When RZone having navigation data on a specific DVD video title recorded therein has been detected, the number of RZone areas configuring the DVD video title is detected. When RZone having navigation data on a next DVD video title recorded therein has been detected, RZone is skipped by the number.

By doing this, even when the DVD video title is composed of a plurality of RZone areas, information reading of RZone which does not include navigation data may not be carried out. Thus, it becomes possible to speed up detection of RZone having the navigation data recorded therein.

In addition, there is a high possibility that navigation data is recorded in next RZone of the arrived RZone by the above skipping. It becomes possible to define the RZone as a candidate for acquiring information which indicates the start position of the DVD video title.

Figure 16:
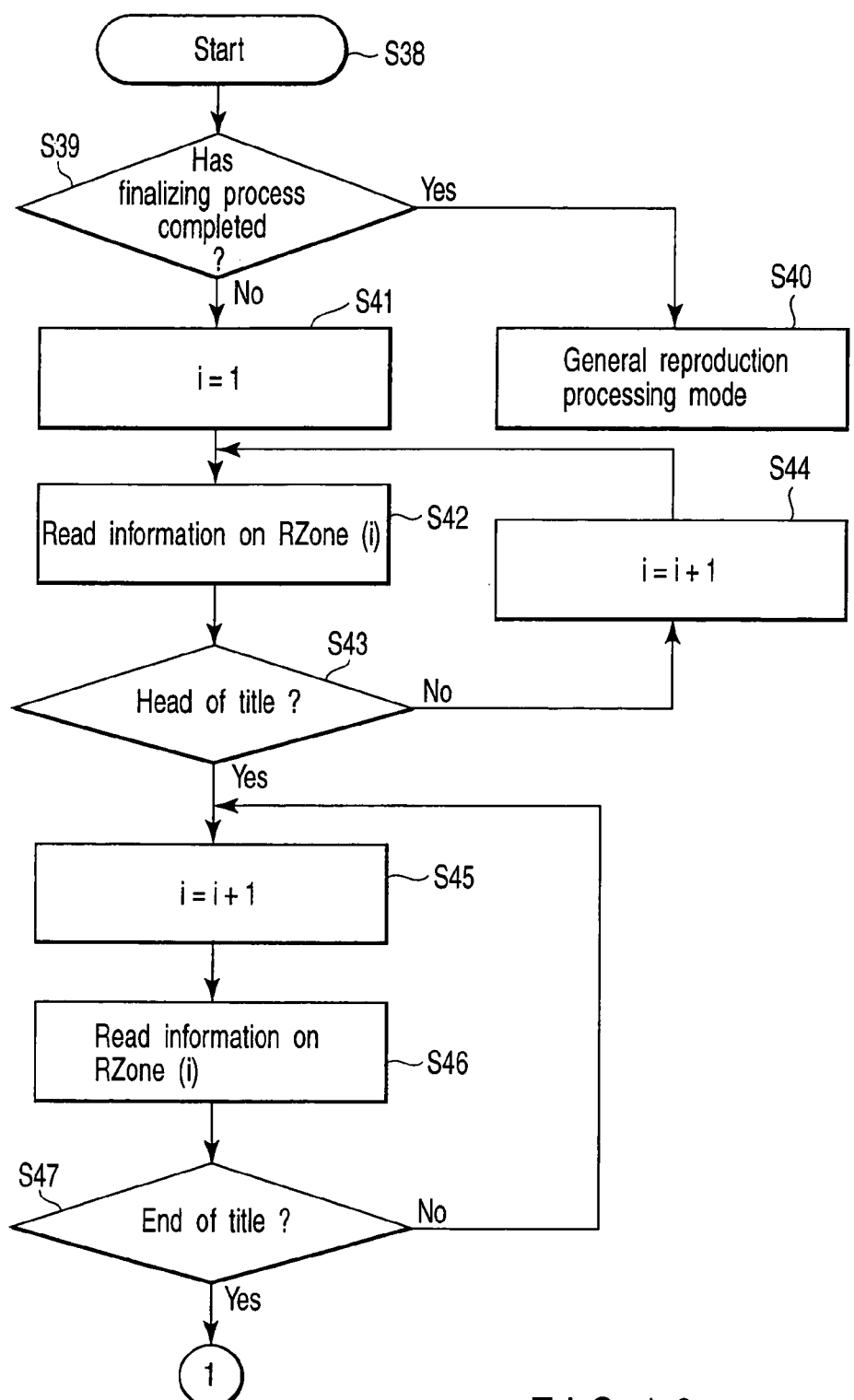
FIG. 16 is a flow chart provided for illustrating a part of the operation of speeding up detection of an RZone having recorded therein navigation data in the embodiment.
Figure 17:
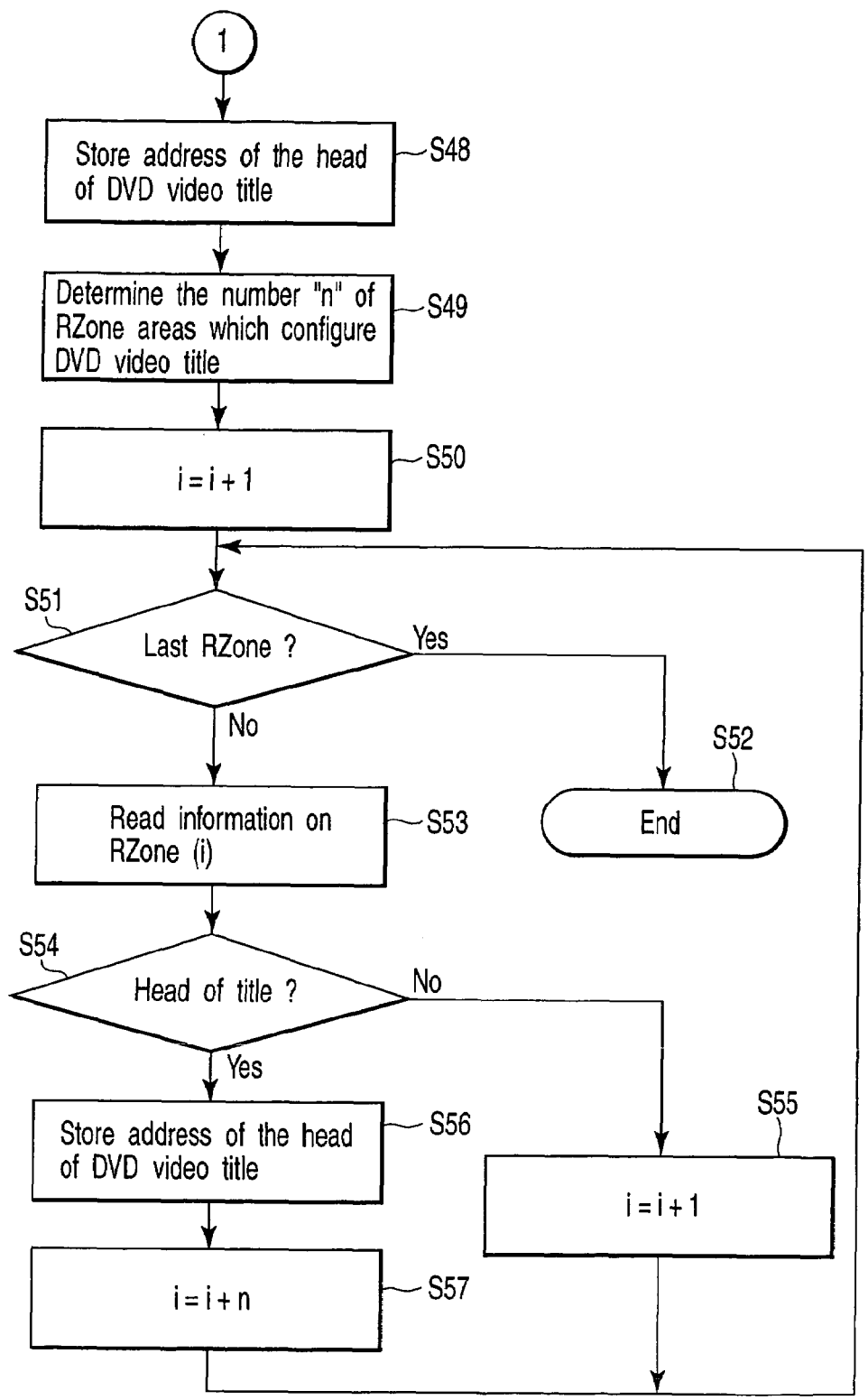
FIG. 17 is a flow chart provided for illustrating a remaining portion of the operation of speeding up detection of an RZone having recorded therein navigation data in the embodiment.

FIGS. 16 and 17 each show a sequence for, after detecting the number of RZone areas which configure the DVD video title, when the head of the DVD video title has been detected, skipping RZone by its number and making a search for the start position of the DVD video title.

First, when a process for acquiring the start position of the DVD video title is started (step S38), the microcomputer block 17 determines whether or not a finalizing process is applied to the DVD-T disk in step S39.

When it is determined that the finalizing process is applied (YES), the microcomputer block 17 moves to a general reproduction processing mode with respect to the DVD-R disk in step S40.

When it is determined that the finalizing process is not applied in step S39 (NO), the microcomputer 17 sets number "i" of RZone to 1 in step S41; reads out RMD concerning RZone(i) from the DVD-R disk in step S42; and reads data on RZone(i) based on the start address of RZone(i) obtained from the RMD information.

Then, in step S43, the microcomputer block 17 determines whether or not data on RZone(i) is navigation data, namely, that RZone(i) is at the head of the DVD video title. When it is determined that the above data is not navigation data (NO), this microcomputer block adds "+1" to "i" in step S44, and processing reverts to step S42.

In addition, in the above step S43, when it is determined that the data on RZone(i) is navigation data (YES), the microcomputer block 17 adds "+1" to "i" in step S45; reads out RMD concerning RZone(i) from the DVD-R disk in step S46; and reads data on RZone(i) based on the start address of RZone(i) acquired from that RMD information.

In step S47, the microcomputer block 17 determines whether or not RZone(i) is the last RZone of the DVD video title. When it is determined that that RZone(i) is not the last RZone (NO), processing reverts to step S45.

In addition, when it is determined that RZone(i) is the last RZone of the DVD video title in step S47 (YES), the microcomputer block 17 goes to step S48 in which the start address of that RZone is stored in the memory unit 17b as an address of the head of the DVD video title. Then, in step S49, this microcomputer block determines the number "n" of RZone areas which configure that DVD video title.

Then, in step S50, the microcomputer block 17 adds +1 to "i". In step S51, it is determined whether or not RZone(i) is the last RZone recorded in the DVD-R disk. When it is determined that the RZone(i) is the last RZone (YES), processing is terminated (step S52).

In addition, when it is determined that RZone(i) is not the last RZone recorded in the DVD-R disk in the above step S51 (NO), the microcomputer block 17 reads out RMD concerning RZone(i) from the DVD-R disk, and reads data on RZone(i) based on the start address of RZone(i) acquired from that RMD information in step S53.

Thereafter, in step S54, the microcomputer block 17 determines whether or not RZone(i) is at the head of the DVD video title. When it is negatively determined (NO), this microcomputer block adds +1 to "i" in step S55. Then, processing reverts to step S51.

Further, when it is determined that RZone(i) is at the head of the DVD video title in the above step S54 (YES), the microcomputer block 17 stores the start address of that RZone in the memory unit 17b as an address of the head of the DVD video title in step S56. In step S57, this microcomputer block adds +n to "i", and processing reverts to step S51.

The speedup process shown in FIG. 14 and the speedup processes shown in FIGS. 16 and 17 are operable independently of each other, and all of these processes can be combined with each other.

Moreover, although, in the above-described embodiments, various descriptions have been given by way of example in which a DVD-R disk is shown as the optical disk 11, the present invention can be applied to all media for recording DVD-video format data in a disk in IWM in real time. For example, the present invention is applied in the case where recording is carried out for the DVD-R disk in IWM as well.

The present invention is not limited to the above-described embodiments, and can be embodied by variously modifying constituent elements without deviating from the spirit of the invention at the stage of carrying out the invention. In addition, a variety of inventions can be formed. For example, some of all the constituent elements shown in the embodiments may be deleted. Further, the constituent elements according to different embodiments may be combined properly with each other.

What is claimed is:

1. A disk reproducing apparatus comprising:
 a disk reproducing unit configured to reproduce a disk having a recording management area in which an RZone having navigation data is allocated at a head thereof, a plurality of titles are then recorded in a mode in which there is allocated an RZone having presentation data managed by the navigation data, and position information on the RZone is recorded; and a reproduction control unit configured to store position information on the RZone having the navigation data as information indicating a start position of the title and to use the stored information as a title reproduction start position.

2. A disk reproducing apparatus according to claim 1, wherein the reproduction control unit comprises:
- a finalizing process determining unit configured to determine whether or not a finalizing process is applied to the disk;
- a detecting unit configured to detect an RZone having the navigation data from the disk which has been determined that the finalizing process is not applied by the finalizing process determining unit; and
- a recording unit configured to store position information on the RZone detected by the detecting unit as information indicating a start position of the title and to use the stored information as a title reproduction start position.

3. A disk reproducing apparatus according to claim 1, wherein the position information on the RZone and size information are recorded in the disk, and the reproduction control unit comprises:
- a finalizing process determining unit configured to determine whether or not a finalizing process is applied to the disk;
- a detecting unit configured to detect RZone areas of a same size from the disk which has been determined that the finalizing process is not applied by the finalizing process determining unit; and
- a recording unit configured to store position information of the RZone having the navigation data from among the RZone detected by the detecting unit as information indicating a start position of the title and to use the stored information as a title reproduction start position.

4. A disk reproducing apparatus according to claim 1, wherein the reproduction control unit comprises:
- a finalizing process determining unit configured to determine whether or not a finalizing process is applied to the disk;
- a number detecting unit configured to detect the number of RZone areas which configure a specific title by sequentially reading an RZone having navigation data and data following the RZone from among RZone areas which configure the specific title from the disk which has been determined that a finalizing process is not applied by the finalizing process determining unit;
- a skipping unit configured to skip data reading from an RZone following the RZone having navigation data from among the RZone areas which configure a title different from the specific title by RZone areas whose number is detected by the number detecting unit; and
- a recording unit configured to store position information on the RZone having the navigation data as information indicating a start position of the title and to use the stored information as a title reproduction start position.

5. A disk reproducing apparatus according to claim 1, wherein the reproduction control unit comprises:
- a finalizing process determining unit configured to determine whether or not a finalizing process is applied to the disk;
- a position information acquiring unit configured to acquire position information for the specific RZone from a recording management area thereof, with respect to the disk which has been determined that a finalizing process is not applied by the finalizing process determining unit;
- a data acquiring unit configured to acquire data on the RZone indicated by the position information acquired by the position information acquiring unit;
- a navigation data determining unit configured to determine whether or not the data acquired by the data acquiring unit is the navigation data; and
- a recording unit configured to store position information on an RZone which has been determined that the acquired data is navigation data by the navigation data determining unit as information indicating a start position of the title, and to use the stored information as a title reproduction start position.

6. A disk reproducing apparatus according to claim 1, wherein the position information on the RZone and size information are recorded in the disk, and the reproduction control unit comprises:
- a finalizing process determining unit configured to determine whether or not a finalizing process is applied to the disk;
- an acquiring unit configured to acquire position information and size information relevant to all RZone areas from a recording management area thereof, with respect to a disk which has been determined that the finalizing process is not applied by the finalizing process determining unit;
- a grouping unit configured to group RZone areas of a same size based on the size information acquired by the acquiring unit;
- a validity verifying unit configured to verify validity by making a syntax check that the acquired data is navigation data with respect to the RZone areas grouped by the grouping unit; and
- a recording unit configured to store the position information acquired by the acquiring unit as information indicating a start position of the title with respect to an RZone which has been verified to be valid by the validity verifying unit and to use the stored information as a title reproduction start position.

7. A disk reproducing apparatus according to claim 1, wherein the reproduction control unit comprises:
- a finalizing process determining unit configured to determine whether or not a finalizing process is applied to the disk;
- a first RZone detecting unit configured to detect an RZone having navigation data from among RZone areas configuring a specific title, from the disk which has been determined that the finalizing process is not applied by the finalizing process determining unit;
- a number detecting unit configured to detect the number of RZone areas configuring the specific title by sequentially reading data on an RZone following the RZone detected by the first RZone detecting unit up to a last RZone configuring the specific title;
- a second RZone detecting unit configured to detect an RZone having navigation from among RZone areas configuring a title different from the specific title, from the disk which has been determined that the finalizing process is not applied;
- a skipping unit configured to skip data reading from an RZone following the RZone detected by the second RZone detecting unit by RZone areas whose number is detected by the number detecting unit; and
- a recording unit configured to store position information on the RZone areas detected by the first and second RZone detecting units as information indicating a start position of the title and to use the stored information as a title reproduction start position.

8. A disk reproducing method comprising:
  a first step of reproducing a disk having a recording management area in which an RZone having navigation data is allocated at a head thereof, a plurality of titles is then recorded in a mode in which there is allocated an RZone having presentation data managed by the navigation data, and position information on the RZone is recorded; and
  a second step of storing position information on the RZone having the navigation data as information indicating a start position of the title and using the stored information as a title reproduction start position.

9. A disk reproducing method according to claim 8, wherein the second step executes:
  determining whether or not a finalizing process is applied to the disk;
  detecting an RZone having the navigation data from the disk which has been determined that a finalizing process is not applied; and
  storing position information on the detected RZone as information indicating a start position of the title and using the stored information as a title reproduction start position.

10. A disk reproducing apparatus according to claim 8, wherein the position information on the RZone and size information are recorded in the disk, and the second step executes:
  determining whether or not a finalizing process is applied to the disk;
  detecting RZone areas of a same size from the disk which has been determined that the finalizing process is not applied; and
  storing position information on the RZone having the navigation data from among the detected RZone as information indicating a start position of the title and using the stored information as a title reproduction start position.

11. A disk reproducing method according to claim 8, wherein the second step executes:
  determining whether or not a finalizing process is applied to the disk;
  detecting the number of RZone areas configuring a specific title by sequentially reading an RZone having navigation data and data following the RZone from among the RZone areas configuring the specific title, from the disk which has been determined that the finalizing process is not applied;
  skipping data reading from an RZone following the RZone having navigation data from among RZone areas which configure a title different from the specific title by RZone areas whose number is detected by the number detecting unit; and
  storing position information on the RZone having the navigation data as information indicating a start position of the title and using the stored information as a title reproduction start position.

12. A disk reproducing method according to claim 8, wherein the second step comprises:
  a step of determining whether or not a finalizing process is applied to the disk;
  a step of acquiring position information relevant to the specific RZone from a recording management area thereof, with respect to the disk which has been determined that the finalizing process is not applied;
  a step of acquiring data on the RZone indicated by the acquired position information;
  a step of determining whether or not the acquired data is the navigation data; and
  a step of storing position information on the RZone which has been determined that the acquired data is the navigation data as information indicating a start position of the title and using the stored information as a title reproduction start position.

13. A disk reproducing method according to claim 8, wherein the position information on the RZone and size information are recorded in the disk, and the second step comprises:
  a step of determining whether or not a finalizing process is applied to the disk;
  a step of acquiring position information and size information relevant to all RZone areas from a recording management area thereof, with respect to the disk which has been determined that the finalizing process is not applied;
  a step of grouping RZone areas of a same size based on the acquired size information;
  a step of verifying validity by making a syntax check that the acquired data is navigation data with respect to the RZone areas grouped by the grouping step;
  a step of storing the position information as information indicating a start position of the title with respect to the RZone which has been verified to be valid and using the stored information as a title reproduction start position.

14. A disk reproducing method according to claim 8, wherein the second step comprises:
  a step of determining whether or not a finalizing process is applied to the disk;
  a first detecting step of detecting an RZone having navigation data from among RZone areas configuring a specific title, from the disk which has been determined that the finalizing process is not applied;
  a number detecting step of detecting the number of RZone areas configuring the specific title by sequentially reading data on an RZone following the RZone detected by the first RZone detecting step up to a last RZone configuring the specific title;
  a second detecting step of detecting an RZone having navigation from among RZone areas configuring a title different from the specific title, from the disk which has been determined that the finalizing process is not applied;
  a skipping step of skipping data reading from an RZone following the RZone detected by the second RZone detecting step by RZone areas whose number is detected by the number detecting step; and
  a recording step of storing position information on the RZone areas detected by the first and second RZone detecting steps as information indicating a start position of the title and using the stored information as a title reproduction start position.

* * * * *